No. 886,048.
PATENTED APR. 28, 1908.
D. W. FLYNN.
DEVICE FOR FACILITATING THE TYING OF CORN TOPS.
APPLICATION FILED JAN. 14, 1908.
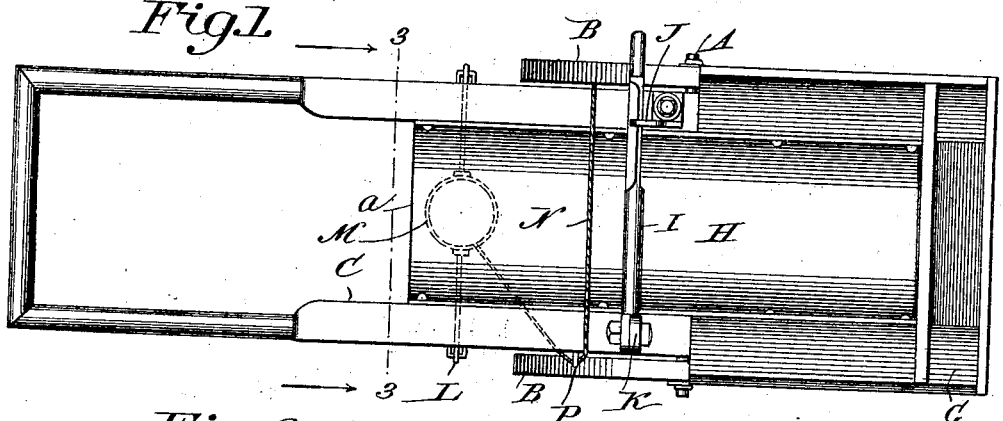
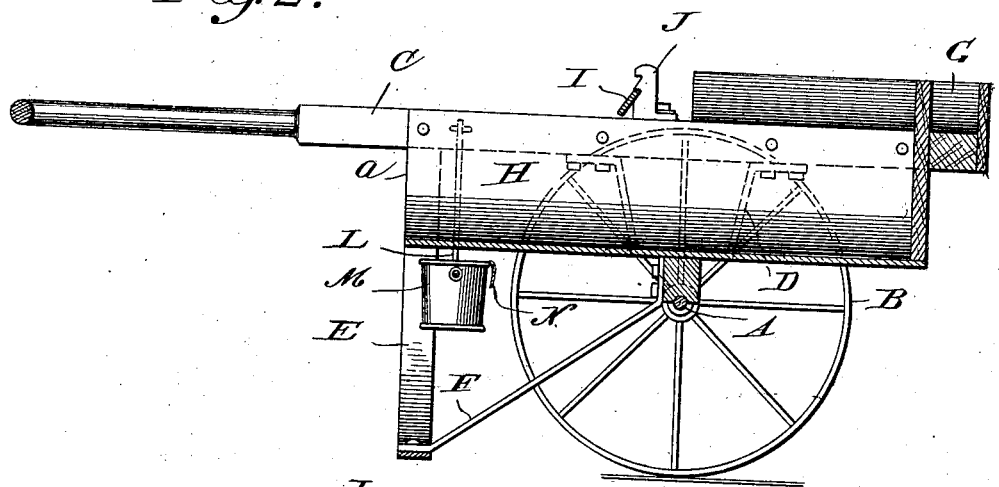
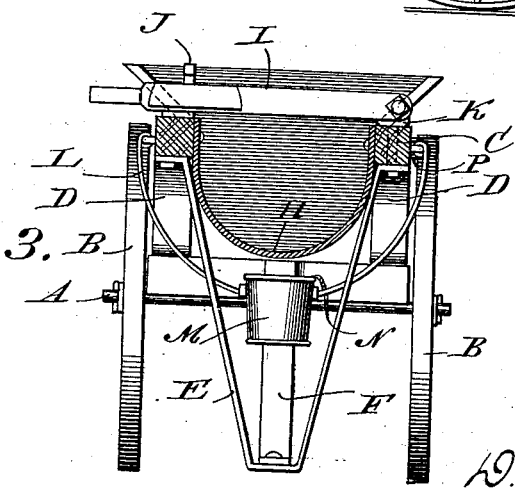

UNITED STATES PATENT OFFICE.

DENNIS W. FLYNN, OF VIOLA, ILLINOIS.

DEVICE FOR FACILITATING THE TYING OF CORN-TOPS.

No. 886,048.  Specification of Letters Patent.  Patented April 28, 1908.

Application filed January 14, 1908. Serial No. 410,827.

*To all whom it may concern:*

Be it known that I, DENNIS W. FLYNN, a citizen of the United States, residing at Viola, in the county of Mercer and State of Illinois, have invented new and useful Improvements in Devices for Facilitating the Tying of Corn-Tops, of which the following is a specification.

My invention pertains to the topping of corn; and it seeks the provision of a device constructed with a view of expediting and rendering easy the tying of corn tops when the corn is topped above the ear.

My novel device is mounted upon wheels so that it may be conveniently pushed between rows of corn, and it comprises a trough-like receiver for the corn tops, means for confining and retaining the corn tops in the receiver incidentally to the tying of the same, and an arrangement whereby the twine employed in the tying may be tightly drawn around the tops and fastened while the tops are confined in the receiver.

With the foregoing in mind the invention will be fully understood from the following description and claim when the same are read in connection with the drawings accompanying and forming part of this specification, in which:

Figure 1 is a plan view of the device constituting the best embodiment of my invention of which I am cognizant. Fig. 2 is a longitudinal vertical section of the same. Fig. 3 is a cross-section taken in the plane indicated by the line 3—3 of Fig. 1, looking in the direction indicated by the arrows.

Similar letters designate corresponding parts in all of the views of the drawings, referring to which:

A is the axle of my novel device. B B are the supporting wheels thereof, C is the main frame of the device which is preferably connected with the axle through the medium of interposed supports D, and E is a rest fixedly connected to and depending from the main frame C at about the proportional distance illustrated from the axle A, and connected, by preference, with the axle through the medium of a brace bar F, best shown in Fig. 2. The said rest E has for its office to maintain the frame C in a horizontal or approximately horizontal position after the manner illustrated in Fig. 2, and it is obvious that when the device is to be moved along between rows of corn the handle end of the frame C will be raised sufficiently to enable the lower end of the rest E to clear the ground.

At its forward end the main frame C is preferably, though not necessarily, provided with a receptacle G designed to carry the knife used in severing the twine, and said main frame is also provided with a trough-like receiver H, open at one end as indicated by *a*, and with a lever I and a keeper J therefor. The lever I is pivoted to swing vertically on a bolt K journaled and adapted to turn in one side bar of the frame C, and consequently it will be manifest that while corn tops are being placed in the receiver H the lever may be made to lie on the said side bar of the frame. Then when a sufficient quantity of corn tops is placed in the receiver H the lever may be swung to the position illustrated crosswise of the device, and then may be swung downward to compress the corn tops, after which said lever may be placed in engagement with one of the teeth of the keeper J so as to hold the mass of corn tops during the tying thereof. In this connection it will be noticed that in order to release the corn tops subsequent to the tying thereof it is simply necessary for the operator of the device to disengage the lever I from keeper J and then swing the said lever about the bolt K until the lever rests on the before mentioned side bar of the frame C.

Connected to the side bars of the frame C, preferably at a point adjacent to the open end *a* of the receiver H is a hanger L which carries a twine holder M, and by reference to Fig. 1 it will be seen that the twine employed, lettered N, is carried from the said holder M through a guide P on one side of the frame C and thence across the trough-like receiver H to the opposite side of the frame where if deemed expedient it may be secured during the formation of a bundle of tops.

In the practical use of my novel device, the same is pushed along between rows of corn, and the corn tops are massed in the receiver H and on the portion of the twine N extending across the said receiver. Then when there is enough corn topped for a bundle, the lever is swung about the bolt K so that the lever rests crosswise of the receiver, after which the lever is pressed downwardly to put the bundle under pressure, and is placed in engagement with the keeper J to hold the bundle in such state and retain it in the receiver. With this done the free end of the twine is brought back over the top of the bundle and after being drawn taut is tied to the major portion of the cord and then the cord is severed. Subsequent to the tying of the bundle of tops as described, the lever I is disengaged from keeper J and is swung back to its position above one side bar of the frame, when the bundle of tops may be readily removed from the receiver H.

It will be gathered from the foregoing that when tied the tops may be shocked as the operator proceeds, and in this way a considerable amount of labor may be saved. It will also be gathered that my novel device is simple and inexpensive in construction and embodies no parts such as are likely to get out of order after a short period of use.

As before stated the construction herein illustrated and described is the best embodiment of my invention known to me, but it is obvious that in the future practice of the invention such changes or modifications may be made as fairly fall within the scope of my invention as defined in the claims appended.

Having described my invention, what I claim and desire to secure by Letters-Patent, is:

1. The herein described device for facilitating the tying of corn tops, comprising a wheel-supported main frame having side bars separated by an intervening space and arranged to be moved in the direction of their length between rows of corn, a longitudinally-disposed trough-like receiver connected to and arranged between the said frame bars and open at one end and closed at its opposite end, a keeper arranged on one frame bar and at one side of the receiver, and a lever capable of both vertical and horizontal movement arranged to be engaged with and disengaged from the said keeper; the said lever being pivoted on an upright bolt and arranged to swing vertically on the bolt, and the said bolt being arranged and adapted to turn about its axis in the frame bar opposite to that bearing the keeper.

2. The herein described device for facilitating the tying of corn tops, comprising a wheel-supported main frame having side bars separated by an intervening space and arranged to be moved in the direction of their length between rows of corn, a longitudinally disposed trough-like receiver connected to and arranged between the said frame bars and open at one end and closed at its opposite end, a keeper arranged on one frame bar and at one side of the receiver, a lever connected with the other frame bar and arranged to swing both vertically and horizontally, a hanger connected to the side bars of the frame and depending therefrom, and a twine-holder carried by said hanger and disposed below the trough-like receiver.

3. In a device for facilitating the tying of corn tops, the combination with a wheel-supported, trough-like receiver open at one end and closed at its opposite end and arranged to be moved in the direction of its length between rows of corn, a keeper connected with the receiver and disposed at one side thereof, and a lever capable of both vertical and horizontal movements connected with the receiver at the opposite side thereof and arranged to be moved into engagement with and disengaged from the keeper.

In testimony whereof I have hereunto set my hand in presence of two subscribing witnesses.

DENNIS W. FLYNN.

Witnesses:
M. J. RYAN,
J. G. SUMMERS.